United States Patent
Kim et al.

(10) Patent No.: US 9,529,227 B2
(45) Date of Patent: Dec. 27, 2016

(54) COATABLE POLARIZER AND LIQUID CRYSTAL DISPLAY DEVICE HAVING THE SAME

(71) Applicant: LG Display Co., Ltd., Seoul (KR)

(72) Inventors: YoungWook Kim, Gyeonggi-do (KR); HyunJong Noh, Gyeonggi-do (KR); JiWoong Park, Jeollabuk-do (KR)

(73) Assignee: LG Display Co., Ltd., Seoul (KR)

( * ) Notice: Subject to any disclaimer, the term of this patent is extended or adjusted under 35 U.S.C. 154(b) by 12 days.

(21) Appl. No.: 14/741,660

(22) Filed: Jun. 17, 2015

(65) Prior Publication Data
US 2015/0362799 A1    Dec. 17, 2015

(30) Foreign Application Priority Data
Jun. 17, 2014    (KR) .................. 10-2014-0073713

(51) Int. Cl.
G02F 1/1335    (2006.01)
G02B 5/30    (2006.01)

(52) U.S. Cl.
CPC ....... G02F 1/133533 (2013.01); G02B 5/3016 (2013.01); G02B 5/3041 (2013.01)

(58) Field of Classification Search
CPC .............. G02F 1/133528; G02F 1/133526; G02F 1/13363; G02F 1/133533; G02F 1/13725; G02F 1/1397; G02B 5/3033; G02B 5/3036
USPC ...................................... 349/96, 97
See application file for complete search history.

(56) References Cited

U.S. PATENT DOCUMENTS 6,057,961 A * 5/2000 Allen .................. G02B 5/3008
                                                    359/489.11
2010/0309415 A1* 12/2010 Rho ...................... G02B 5/3008
                                                    349/96

* cited by examiner

*Primary Examiner* — Mike Qi
(74) *Attorney, Agent, or Firm* — Morgan, Lewis & Bockius LLP

(57) ABSTRACT

There is provided a coatable polarizer which incurs low manufacturing cost and has an excellent polarization degree and transmittance. A plurality of polarization layers are formed on the coatable polarizer, and each of the polarization layers include about 5 to 7 wt % of dichroic dyes, whereby a light component parallel to an alignment direction of a dichroic dye, among light having a wavelength corresponding to a color, is absorbed to have polarization characteristics.

27 Claims, 5 Drawing Sheets

COATABLE POLARIZER AND LIQUID CRYSTAL DISPLAY DEVICE HAVING THE SAME

CROSS-REFERENCE TO RELATED APPLICATION

Pursuant to 35 U.S.C. §119(a), this application claims the benefit of earlier filing date and right of priority to Korean Application No. 10-2014-0073713, filed on Jun. 17, 2014, the contents of which is incorporated by reference herein in its entirety.

BACKGROUND OF THE INVENTION

1. Field of the Invention

The present disclosure relates to a polarizer and, more particularly, to a coatable polarizer which has a high degree of polarization and transmittance and is low in price and a liquid crystal display having the same.

2. Background of the Invention

In general, a liquid crystal display includes two substrates disposed to face one another at a predetermined space therebetween and a liquid crystal layer injected between the two substrates. Here, liquid crystal has refractive index anisotropy with respect to a shorter axis and a longer axis, making light have a refractive index changing when transmitting through the liquid crystal layer, and a desired image may be realized by adjusting light transmittance.

In order to adjust light transmittance, polarizers are attached to the two substrates. Here, the polarizers are aligned to be parallel or perpendicular to each other in an optical axis direction to adjust transmittance of light incident to or output from a liquid crystal layer, thus realizing an image.

In general, a polarizer is formed by performing coloring based on adsorption of dichroic dye and uniaxial orientation or biaxial orientation on a polyvinylalcohol (PVA)-based resin film, and stacking a transparent resin film, in particular, a polarizer protective film based on an acetic acid cellulose represented by triacetylcellulose (TAC), on one surface or both surfaces of the polarizer on which the dichroic dye has been oriented, through an adhesive layer. The polarizer is bonded to a liquid crystal panel with an adhesive.

However, when the polarizer is manufactured through the related art method as described above, the polarizer becomes relatively thick, leading to shortcomings of poor heat resistance and moisture resistance of the manufactured polarizer, and in particular, since the orientation process (or stretching process) and the dye process are performed on the PVA polarizer, a process time is lengthened and manufacturing cost increases.

In order to solve such problems, a coatable polarizer which is manufactured through a coating scheme has been recently proposed.

Coatable polarizers include a host-guest type polarizer, a lyotropic type polarizer, and the like. In the host-guest polarizer, R, G, and B dyes as guests are mixed to liquid crystal as hosts, and when the hosts are aligned in an alignment direction of an alignment layer therebelow, the R, G, and B dyes are also aligned to absorb light parallel to the alignment direction (absorption direction) of the dyes and allow light perpendicular thereto to be transmitted therethrough, thus polarizing light. In the lyotropic type polarizer, lyotropic polymers are aligned in a row to polarize light. In addition, a wire-grid type polarizer has also been proposed. In the wire-grid type polarizer, metal nanowires are aligned in a predetermined direction on a substrate and a polarization direction of incident light is determined according to an alignment direction of the metal nanowires.

Among the various polarizers, the host-guest type polarizer has been mainly researched in consideration of ease in manufacturing and low manufacturing cost.

However, the host-guest type polarizer has the following problems.

As mentioned above, in the host-guest type polarizer, since the R, G, and B dyes as guests are mixed to liquid crystal as hosts to align liquid crystal, and thus, the R, G, and B dyes are aligned in a particular direction. Here, the dyes, guest materials, cannot absorb every visible light, and thus, three to five types of dyes are mixed to be used to absorb light of a particular polarization component.

However, in the related art polarizer, since the several types of guests are mixed to the host, it is not easy to mix the hosts and the guests in an appropriate ratio, and thus, it is not possible to precisely align the guests along the host. As a solution, the hosts and the guests are mixed in an appropriate ratio to precisely align the guests. In this case, however, since the various types of guests are not sufficiently mixed, a polarization degree is not uniformly maintained in the entire region of visible rays, reducing the polarization degree.

SUMMARY OF THE INVENTION

Accordingly, the present invention is directed to a coatable polarizer and liquid crystal display device having the same that substantially obviate one or more of the problems due to limitations and disadvantages of the related art.

Therefore, an object of the present invention is to provide a coatable polarizer which incurs low manufacturing cost and having good transmittance and polarization degree, and a liquid crystal display device having the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings To achieve these and other advantages and in accordance with the purpose of this specification, as embodied and broadly described herein, a polarizer may comprise a substrate; and a plurality of polarization layers formed on the substrate, wherein each of the polarization layers includes hosts and dichroic dyes having different colors. The dichroic dyes may be red, green, and blue dyes or cyan, yellow and magenta dyes. The polarization layers may include three polarization layers each including dyes having different colors or may include two polarization layers in which one layer includes a dye having one type of color and the other layer includes dyes having two types of colors.

In another aspect, a liquid crystal display (LCD) device may comprise a liquid crystal panel on which an image is displayed; and a polarizer attached to at least one of both surfaces of the liquid crystal panel, wherein the polarizer includes a substrate and a plurality of polarization layers each including dichroic dyes having different colors.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention. In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1A:
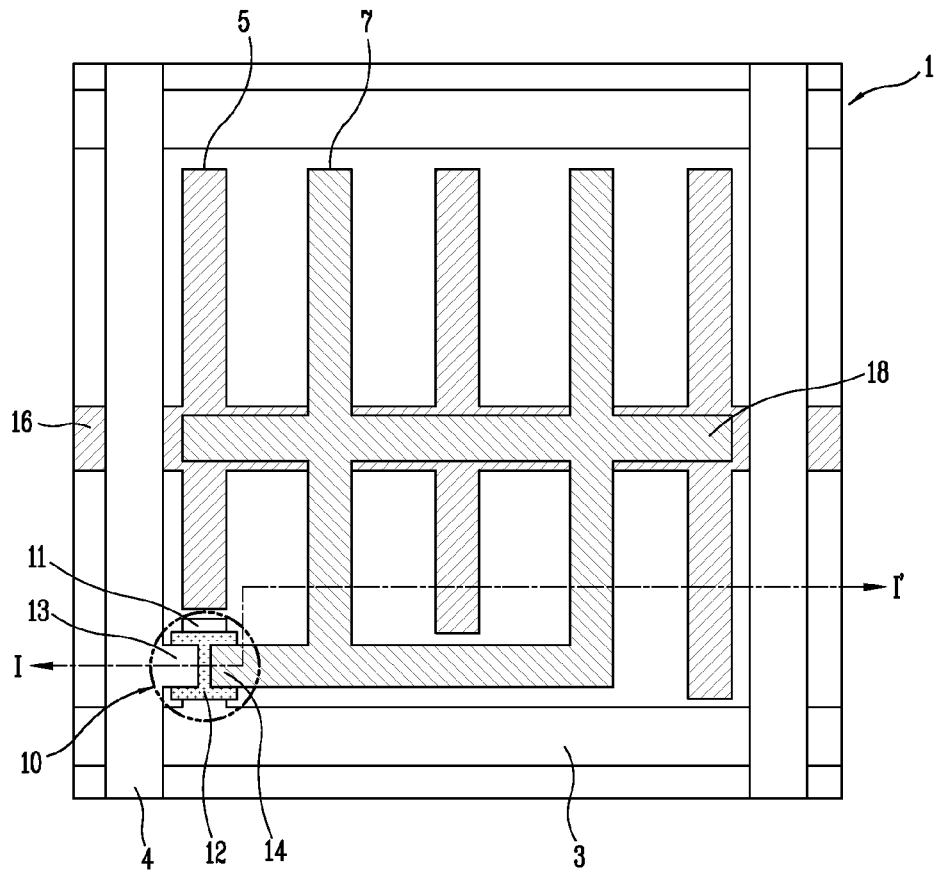
FIG. 1A is a cross-sectional view illustrating a structure of a liquid crystal display according to an embodiment of the present disclosure.
Figure 1B:
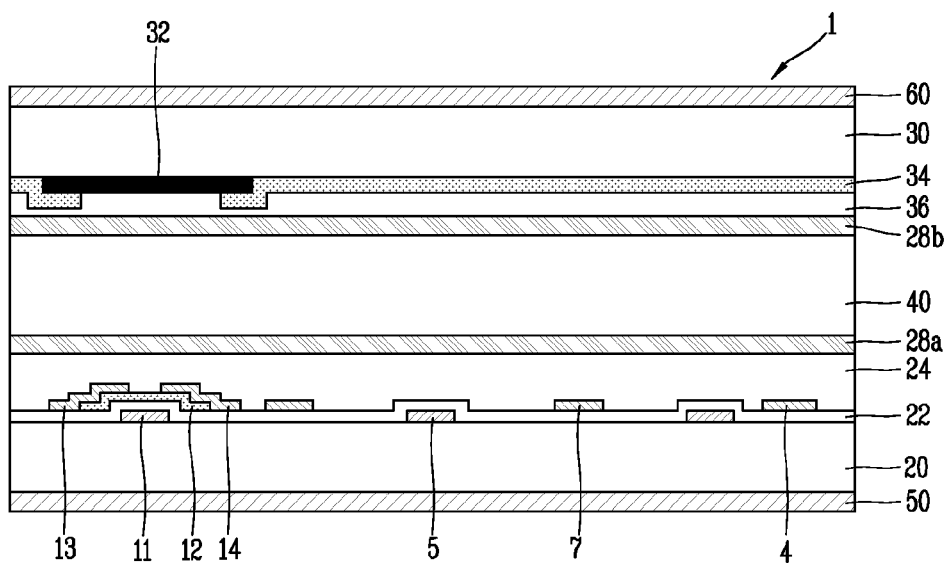
FIG. 1B is a cross-sectional view taken along line I-I' of FIG. 1A.

FIG. 1A is a plan view illustrating a structure of a liquid crystal display (LCD) device according to an embodiment of the present disclosure, and FIG. 1B is a cross-sectional view taken along line I-I' of FIG. 1A. Here, the LCD device illustrated in FIGS. 1A and 1B is an in-plane switching (IPS) mode LCD device, but the present disclosure is not limited thereto and may also be applied to various modes of LCD devices such as a twisted nematic (TN) mode LCD device, a vertical alignment (VA) mode LCD device, a fringe field switching (FFS) mode LCD device.

As illustrated in FIG. 1A, a pixel of a liquid crystal panel 1 is defined by a gate line 3 and a data line 4 disposed horizontally and vertically. Although a (n,m)th pixel is illustrated in the drawing, but in the actual liquid crystal panel, m number of gate lines 3 and m number of data lines 4 are disposed to form n×m number of pixels in the entirety of the liquid crystal panel 1. A thin film transistor (TFT) 10 is formed in an intersection of the gate line 3 and the data line 4 of the pixel. The TFT 10 includes a gate electrode 11 to which a scan signal is applied from the gate line 3, a semiconductor layer 12 formed on the gate electrode 11 and activated to form a channel layer when a scan signal is applied thereto, a source electrode 13 formed on the semiconductor layer 12 and to which an image signal is applied through the data line 4, and a drain electrode 14. The TFT 10 applies an image signal input from the outside to a liquid crystal layer 40.

In the pixel, a plurality of common electrodes 5 and a plurality of pixel electrodes 7 are disposed to be aligned to be substantially parallel to the data line 4. Also, a common line 16 is disposed in the middle of the pixel and connected to the common electrodes 5. A pixel electrode line 18 is disposed on the common line 16 and connected to the pixel electrodes 7. The pixel electrode line 18 overlaps the common line 16. As the common line 16 and the pixel electrode line 18 overlap each other, storage capacitance is formed in the IPS mode LCD device.

Liquid crystal molecules of the liquid crystal layer 40 are positive or negative liquid crystal molecules. Thus, in the IPS mode LCD device, liquid crystal molecules are aligned to be substantially horizontal or vertical to the common electrodes 5 and the pixel electrodes 7. When the liquid crystal molecules are positive liquid crystal molecules, the liquid crystal molecules are aligned horizontally so as to be substantially identical to the electrodes, and when the liquid crystal molecules are negative liquid crystal molecules, the liquid crystal molecules are aligned to be substantially perpendicular to the direction of the electrodes.

When the TFT 10 operates and a signal is applied to the pixel electrodes 7, an in-plane field substantially parallel to the liquid crystal panel 1 is generated between the common electrodes 5 and the pixel electrodes 7. The liquid crystal molecules rotate to be parallel to the liquid crystal panel 1 along the in-plane field, preventing gray inversion on the side due to refractive index anisotropy of the liquid crystal molecules.

As illustrated in FIG. 1B, the gate electrode 11 is formed on a first substrate 20, and a gate insulating layer 22 is stacked on the entirety of the first substrate 20. The semiconductor layer 12 is formed on the gate insulating layer 22, and the source electrode 13 and the drain electrode 14 are formed thereon. Also, a passivation layer 24 is formed on the entirety of the first substrate 20, and a first alignment layer 28a having a determined alignment direction for aligning liquid crystal molecules through a method such as rubbing, or the like, is formed thereon.

Also, a plurality of common electrodes 5 are formed on the first substrate 20, and a pixel electrode 7 and a data line 4 are formed on the gate insulating layer 22, generating in-plane field E between the common electrodes 5 and the pixel electrodes 7.

A black matrix 32 and color filter layers 34 are formed on a second substrate 30. The black matrix 32, serving to prevent light leakage, is a region where liquid crystal molecules do not operate. As illustrated, the black matrix 32 is mainly formed between the TFT 10 region and between pixels (i.e., gate line and data line region0. The color filter layer 34 includes R (red), B (blue), and G (green) color filters and realizes colors in actuality. An overcoat layer 36 is formed on the color filter layer 34 to protect the color filter layer 34 and enhance smoothness of the substrate, and a second alignment layer 28b having a determined alignment direction is formed thereon.

A liquid crystal layer 40 is formed between the first substrate 20 and the second substrate 30, and a first polarizer 50 and a second polarizer 60 are attached to the first substrate 20 and the second substrate 20, respectively, to linearly polarizing light input to and output from the liquid crystal panel to adjust transmittance of light which transmits through the liquid crystal panel.

Optical axis directions of the first polarizer 50 and the second polarizer 60 differ according to display modes of the LCD device.

In a normally black mode, polarization axes of the first polarizer 152 and the second polarizer 154 are perpendicular to each other. Thus, light which transmits through the first polarizer 50 is linearly polarized in an x axis direction so as to be input to the LCD device. When a signal is not applied to the liquid crystal panel, liquid crystal molecules of the liquid crystal panel are aligned in a y-axis direction, i.e., to be horizontal to the liquid crystal panel, and thus, light incident to the liquid crystal panel transmits through the liquid crystal panel in a linearly polarized state. Meanwhile, a polarization axis of the second polarizer 60 attached to the second substrate 30 is perpendicular to the polarization direction of light which has transmitted through the liquid crystal layer and light is entirely absorbed by the polarizer of the upper substrate so light is not output from the second polarizer 60, and thus, a screen is displayed to be black.

In a normally white mode, polarization axes of the first polarizer 152 and the second polarizer 154 are parallel to each other. Thus, light which transmits through the first polarizer 50 is linearly polarized in an x axis direction so as to be input to the LCD device. When a signal is not applied to the liquid crystal panel, liquid crystal molecules of the liquid crystal panel are aligned in a y-axis direction, i.e., to be horizontal to the liquid crystal panel, and thus, light incident to the liquid crystal panel transmits through the liquid crystal panel in a linearly polarized state. Meanwhile, a polarization axis of the second polarizer 60 attached to the second substrate 30 is horizontal to the polarization direction of light which has transmitted through the liquid crystal layer and light is entirely transmitted by the polarizer of the upper substrate so light is output from the second polarizer 60, and thus, a screen is displayed to be white.

Figure 2:
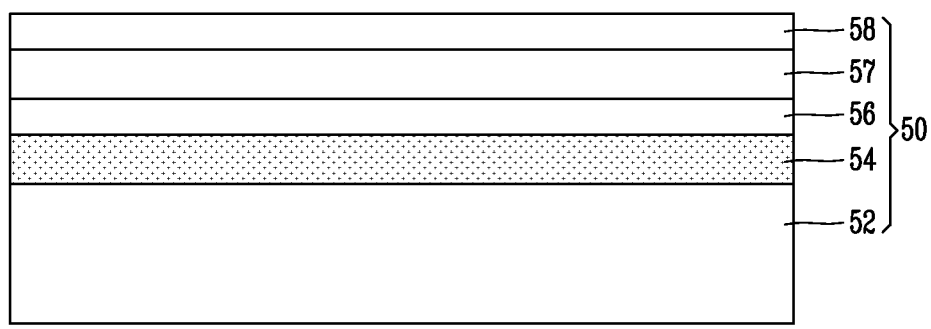
FIG. 2 is a cross-sectional view illustrating a structure of a polarizer according to an embodiment of the present disclosure.

The first polarizer 50 and the second polarizer 60 are host-guest type polarizers, including a plurality of layers. FIG. 2 illustrates a structure of a polarizer according to an embodiment of the present disclosure. Here, the first polarizer 50 and the second polarizer 60 illustrated in FIG. 1B have the same structure, and thus, the first polarizer 50 will be described as a representative polarizer, and here, the first polarizer 50 will be referred to as a polarizer, rather than the specific title of the first polarizer.

As illustrated in FIG. 2, the polarizer 50 according to an embodiment of the present disclosure includes a substrate 52, an alignment layer 54 formed on the substrate 52, and first to third polarization layers 56, 57, and 58 formed on the alignment layer 54.

The substrate 52 is formed of a transparent film or a transparent material such as glass or plastic, and the alignment layer 54 is formed of polyimide or polyamide. As alignment such as rubbing is performed on the alignment layer 54, numerous micro-grooves are formed in a predetermined direction in the entirety of the alignment layer 54.

The first to third polarization layers 56, 57, and 58 are formed of a host material and a guest material. As the host material, liquid crystalline polymer or reactive mesogens exhibiting liquid crystalline properties is used. Here, the reactive mesogens, a liquid crystal material including an end group available to be polarized, is monomer molecules having a liquid crystal phase by including an end group that can be polarized with mesogens manifesting liquid crystalline properties.

As the first to third polarization layers 56, 57, and 58 are applied to the alignment layer 54, the host material interacts with the micro-grooves formed on the alignment layer 54 so as to be aligned in an alignment direction.

The guest material is formed of dichroic dye. The dichroic dye absorbs one of two polarization components and allows the other to be transmitted therethrough. As the dichroic dye, an iodine group, an anthraquinone group, porphyrin azo, non-azo, triazo, and the like, may be used.

The dichroic dye absorbs light having a particular wavelength region or allows such to be transmitted therethrough, and in an embodiment, the dichroic dye absorbs light having a wavelength band corresponding to R, G, and B colors and allows such to be transmitted therethrough, thereby polarizing visible light.

Also, the dichroic dye may be cyan, magenta, or yellow dye, rather than R, G, and B dye. That is, in an embodiment of the present disclosure, a polarization layer is formed as triple layers, and each of the polarization layers may absorb a light component of a wavelength band corresponding to the R, G, and B colors or a light component of a wavelength band corresponding to cyan, magenta, and yellow color, thereby absorbing visible light in a particular direction (direction in which the dichroic dye is aligned) to polarize visible light.

In this aspect, the polarization layer of the polarizer in the present embodiment is not limited to the triple layers but may also be formed as a dual layer or a quadruple layers or greater according to types of the dichroic dyes included in the polarization layers, that is, according to wavelength bands of visible light absorbed by a corresponding polarization layer.

In this manner, in an embodiment of the present disclosure, various types of dichroic dyes may be used, but for the purposes of description, dichroic dyes corresponding to R, G, and B colors will be described hereinafter.

The dichroic dyes of R, G, and B colors are mixed in a host material and aligned along the host material when the host material is aligned. That is, the R, G, and B dyes are aligned in the direction of the micro-grooves of the alignment layer 54, that is, in a rubbing direction executed in the alignment layer 54.

In this manner, since the R, G, and B dyes are aligned in a predetermined direction, when light is input, a polarization component parallel to the alignment direction of the R, G, and B dyes, that is, the absorption direction, is absorbed, and a polarization component perpendicular to the absorption direction is transmitted, whereby incident light is polarized to a light having a particular polarization direction.

Figure 3:
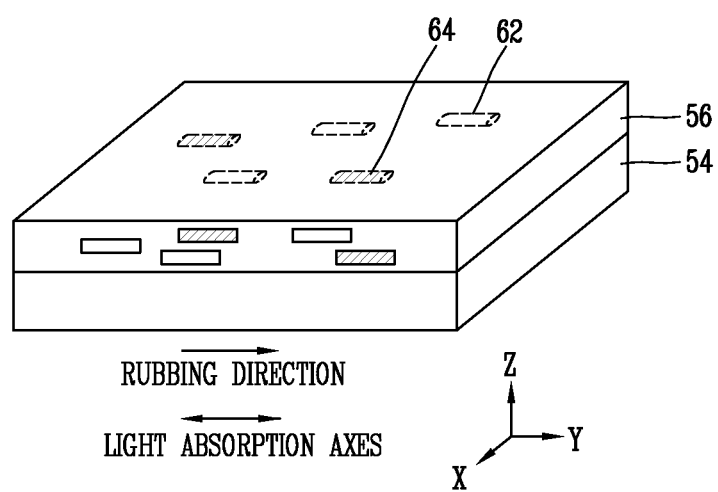
FIG. 3 is a view illustrating an arrangement of hosts and guests in a polarizer.

FIG. 3 is a view illustrating an alignment direction and light absorption layer of a host material and a guest material of the polarization material applied to the alignment layer.

As illustrated in FIG. 3, when the polarization layer 56 in which R, G, and B dyes 64 are mixed with a liquid crystalline polymer or reactive mesogens 62 and R, G, and B dyes 64 as guests are mixed is applied to the alignment layer 54 rubbed in the y direction, the micro-grooves formed on the alignment layer 64 and the host material interact and the reactive mesogens 62 (or liquid crystalline polymer) are aligned in the y direction, and the R, G, and B dyes 64 are also aligned along the reactive mesogens 62, and as the polymerization is in progress, the alignment direction is maintained.

When light is irradiated to the polarization layer 56 on which the reactive mesogens 62 and the dichroic dyes 64 are aligned, a polarization component of the y direction parallel to the dichroic dyes 64 is absorbed by the dichroic dyes 64, and thus, y direction becomes a light absorption axis, and a polarization component of the x direction perpendicular to the alignment of the dichroic dyes 64 is transmitted as is, rather than being absorbed, and thus, the x direction becomes a light transmission axis.

Meanwhile, in an embodiment of the present disclosure, a first polarization layer 156, a second polarization layer 157, and a third polarization layer 158 include dyes of different colors, and the reason is as follows.

In an embodiment of the present disclosure, after a single polarization layer is formed, all of R, G, and B dyes may be included in the single polarization layer. In this case, however, since various types of guests are mixed in a single host, it is not possible to mix the hosts and the guests in an appropriate ratio, making it impossible to precisely align the guests along the host. Thus, light in a particular direction (e.g., x direction) is not completely absorbed but a partial amount thereof is transmitted, degrading a polarization degree.

As a solution thereto, when the hosts and the guests are mixed in an appropriate ratio to precisely align the guests, since various types of guests are not sufficiently mixed, a polarization degree is not uniformly maintained in the entire region of visible light, reducing a polarization degree.

In contrast, however, in an embodiment of the present disclosure, polarization layers are formed as a plurality of layers and dichroic dyes of different colors are included in the polarization layers 156, 157, and 158, respectively. That is, in an embodiment of the present disclosure, since guests having the same color as that of the hosts are mixed in one polarization layer, the hosts and the guests may be mixed in an appropriate ratio, and thus, guests may be precisely aligned along the host, whereby a light component of a corresponding direction among light having a wavelength corresponding to the color may be completely absorbed.

Here, R, G, and B are included in the first polarization layer 156, the second polarization layer 157, and the third polarization layer 158, respectively, and here, the same dye is not dually included in two of the first polarization layer 156, the second polarization layer 157, and the third polarization layer 158, and the R, G, and B dyes may be randomly included in the first polarization layer 156, the second polarization layer 157, and the third polarization layer 158.

Dichroic dyes in an amount of 1 to 7 wt %, preferably, 3 to 7 wt % is mixed in the first polarization layer 156, the second polarization layer 157, and the third polarization layer 158, and here, the dichroic dyes may include cyan, magenta, and yellow dyes, as well as R, G, and B dyes.

When the dichroic dyes mixed in the polarization layers 156, 157, and 158 are less than 1 wt %, absorption of irradiated light is incomplete, degrading a polarization degree, and when the dichroic dyes exceeds 7 wt %, light transmittance is degraded.

Dichroic dyes having different colors are included in the polarization layers 156, 157, and 158, and since the dichroic dyes of the polarization layers are precisely aligned along the hosts, in case of light incident to the plurality of polarization layers 156, 157, and 158, light component of a particular direction in light having a wavelength band corresponding to R, G, and B colors may be completely absorbed to completely polarize incident visible light.

Table 1 shows a polarization degree and transmittance of the polarizer according to an embodiment of the present disclosure, in which polarization degrees and transmittance of the related art PVA polarizer and a single polarizer in which a plurality of dyes are mixed in a single polarization layer are compared.

TABLE 1

|  |  | Transmittance (Ts) | Polarization degree(P.E) |
|---|---|---|---|
| PVA polarizer |  | 43% | 99.995% |
| Single | Thickness 5 μm | 25% | 99.2% |
| layer host-guest | 3.5 μm | 33% | 97.5% |
| polarizer | 2 μm | 40% | 90.3% |
| Multi-ayer | 5 μm | 40% | 99.5% |
| polarizer of | 3.5 μm | 43% | 99.3% |
| present invention | 2 μm | 42% | 99.1% |

The multi-layer polarizer according to an embodiment of the present disclosure has transmittance (Ts) ranging from 40 to 43% and a polarization degree (P.E) ranging from 99.1 to 99.5% according to thicknesses, exhibiting small variations in the transmittance and polarization degree according to thicknesses. Thus, compared with the related art PVA polarizer, even though the polarizer according to an embodiment of the present disclosure is used, the transmittance and polarization degree similar to those of the PVA polarizer can be exhibited.

Meanwhile, the single-layer host-guest polarizer in which all of R, G, and B dyes included in a single polarization layer has transmittance ranging from about 25 to 40% and a polarization degree ranging from 90.3 to 99.2%, showing large variations in the transmittance and polarization degree according to thicknesses. In contrast, in the polarizer according to an embodiment of the present disclosure, variations rarely made according to thicknesses. Thus, compared with the single-layer host-guest polarizer, the polarizer according to an embodiment of the present disclosure may secure desired transmittance and polarization degree even in the small thickness, when the polarizer according to an embodiment of the present disclosure is applied to an LCD device, a thickness and weight of the LCD device may be reduced. In the present embodiment, even when an overall thickness of the first to third polarization layers 56, 57, and 58 is equal to or less than 10 μm, preferably, 5 μm, desired transmittance and polarization degree may be obtained.

In a case where a plurality of polarization layers including a single dye are formed, since the single dye in an amount of 1 to 7 wt %, preferably, 3 to 7 wt %, is included in each of the polarization layers, a relatively large amount of dyes may be included, compared with a case where various types of dyes are included in a single polarization layer, and as a result, light of a wavelength corresponding to a color of a corresponding dye may be completely absorbed.

Hereinafter, a method of manufacturing the polarizer having this structure will be described in detail.

FIGS. 4A through 4D are cross-sectional views illustrating a method of manufacturing a polarizer according to an embodiment of the present disclosure. Here, various dyes may be used as dichroic dyes but for the purposes of description, R, G, and B dyes will be described.

Figure 4A:
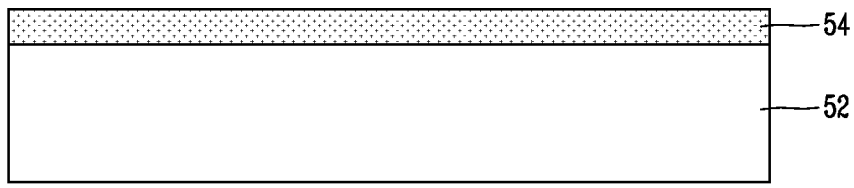
FIGS. 4A through 4D are cross-sectional views illustrating a method of manufacturing a polarizer according to an embodiment of the present disclosure.

First, as illustrated in FIG. 4A, an alignment material is applied to a substrate 52 formed of a transparent film or a transparent material such as glass or plastic to form an alignment layer 54. Here, the alignment material is a polyimide or a polyamide. After polyimide or polyamide is applied, heat is applied to cure the polyimide or polyamide to thus form the alignment layer 54.

Figure 4B:
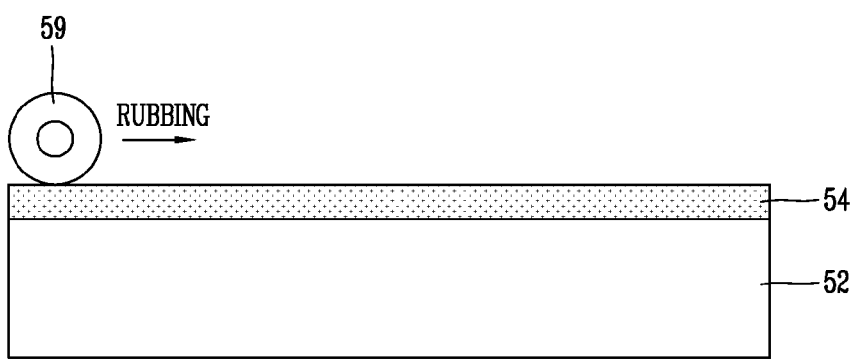

Thereafter, as illustrated in FIG. 4B, a rubbing roll 59 is positioned on one side of the alignment layer 54 and moved toward the other side of the alignment layer 54 or the substrate 52 may be moved to run the alignment layer 54 to form a plurality of micro-grooves (not shown) aligned in the rubbing direction on the alignment layer 54.

Figure 4C:
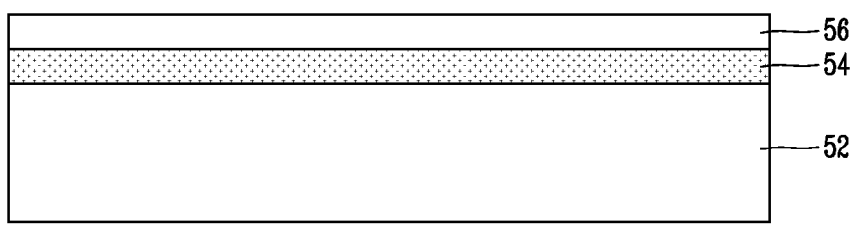

Thereafter, as illustrated in FIG. 4C, a first polarization material obtained by mixing a 3 to 7 wt % of dichroic dye having a red (R) color with hosts such as liquid crystalline polymer (or liquid crystalline high molecules), liquid crystalline low molecules, or oligomer is applied to the alignment layer 54 and cured to form a first polarization layer 56. When the first polarization material is applied, the hosts interacts with the micro-grooves of the alignment layer (that is, controlled by the anchoring energy of the alignment layer) so as to be aligned in a predetermined direction, and at the same time, the dichroic dye having the red (R) color as a guest is aligned along the host. In this state, the first polarization layer 56 is cured and the dichroic dye having the red (R) color is aligned in a preset direction constantly.

Here, as the first polarization material, a 3 to 7 wt % of dichroic dye having a green (G) color may be mixed with the host, or a 3 to 7 wt % of dichroic dye having a blue (B) color may be mixed with the host. The first polarization layer 56 may be cure by applying heat or irradiating light.

Figure 4D:
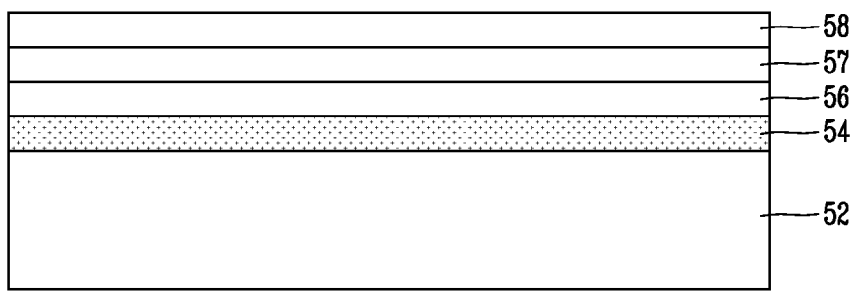

Thereafter, as illustrated in FIG. 4D, a second polarization material obtained by mixing a dichroic dye having a green (G) color is applied to the first polarization layer 56 and cured to form a second polarization layer 57, and thereafter, a third polarization material obtained by mixing a dichroic dye having a blue (B) color is applied to the second polarization layer 57 and cured to form a third polarization layer 58.

When the second polarization material and the third polarization material are applied, the anchoring energy of the alignment layer still affect the hosts of the second polarization material and the third polarization material, and thus, the hosts of the second polarization material and the hosts of the third polarization material are aligned in a preset direction (rubbing direction) and the dichroic dyes are also aligned along the host. In this state, the second polarization layer 57 and the third polarization layer 58 are cured so that the dichroic dyes having the green (G) color and the blue (B) color are aligned in the preset direction constantly.

Figure 5A:
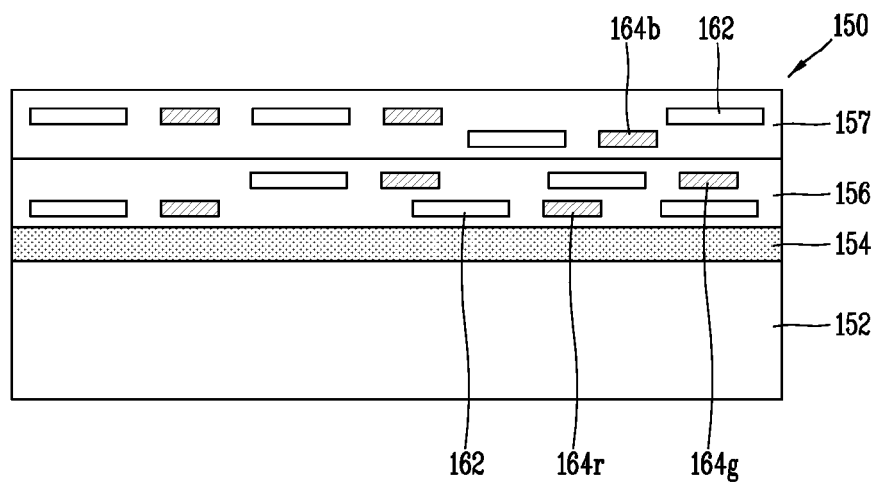
FIGS. 5A through 5C are cross-sectional views illustrating structures of a polarizer according to another embodiment of the present disclosure.
Figure 5B:
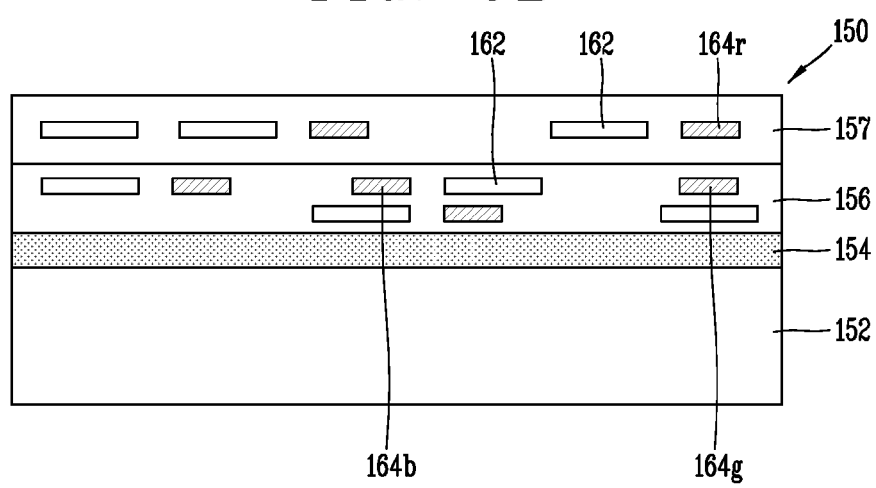
Figure 5C:
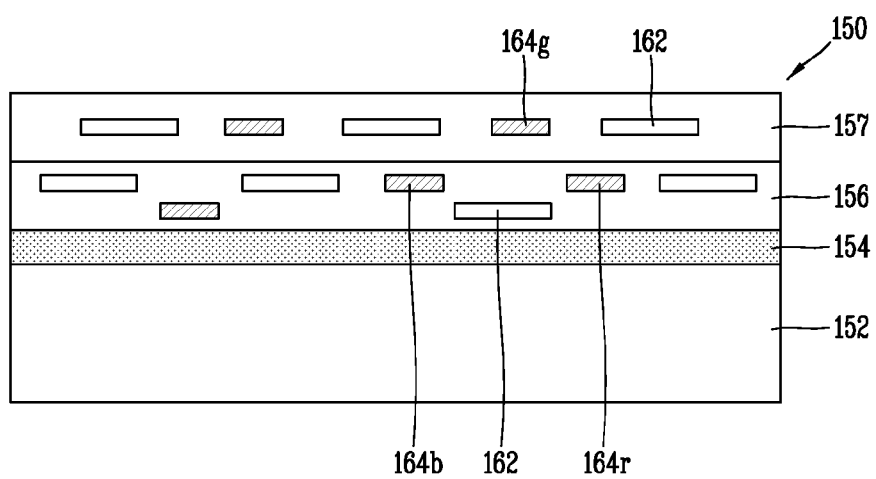

FIGS. 5A through 5C are cross-sectional views illustrating structures of a polarizer according to another embodiment of the present disclosure. Compared with the polarizer according to the embodiment illustrated in FIG. 2 in which the three polarization layers are formed and one type of dichroic dye is included in each of the polarization layer, in the present embodiment, the polarizer includes two polarization layers and one polarization layer includes two types of dichroic dyes and the other layer includes one type of dichroic dye.

As illustrated in FIG. 5A, a polarizer 150 according to the present embodiment includes a substrate 152, an alignment layer 154 formed on the substrate 152, and a first polarization layer 156 and a second polarization layer 157 formed on the alignment layer 154.

The first polarization layer 156 includes the reactive mesogens 162 (or liquid crystalline polymer), a dichroic dye 164r having a red (R) color and a dichroic dye 165g having a green (G) color, and the reactive mesogens 162 are aligned in a rubbing direction of the alignment layer 154, and the dichroic dye 164r having the red (R) color and the dichroic dye 164g having the green (G) color are aligned along the reactive mesogens 162. Here, the first polarization layer 156 includes 1 to 3 wt % of dichroic dye 164f having the red (R) color and the dichroic dye 165g having the green (G) color.

The second polarization layer 157 includes the reactive mesogens 162 (or liquid crystalline polymer) and a dichroic dye 164b having a blue (B) color, and the reactive mesogens 162 are aligned in a rubbing direction of the alignment layer 154 and the dichroic dyes 164b having the blue (B) color are aligned along the reactive mesogens 162. Here, 1 to 7 wt % of dichroic dyes 164b having the blue (B) color are included in the second polarization layer 157.

Also, in the polarizer having this structure, the reactive mesogens 162 and the dichroic dyes 164r, 164g, and 164b are aligned, light component parallel to the direction, among light having wavelength bands corresponding to the R, G, and B colors, is absorbed to polarize incident light.

As illustrated in FIG. 5B, the polarizer having this structure includes the reactive mesogens 162 (or liquid crystalline polymer), the dichroic dye 164g having a green (G) color, and a dichroic dye 164b having a blue (B) color, and the reactive mesogens 162 are aligned in the rubbing direction of the alignment layer 164 and the dichroic dye 164g having the green (G) color and the dichroic dye 164b having the blue (B) color are aligned along the reactive mesogens 162.

Also, the second polarization layer 157 includes the reactive mesogens 162 (or polycrystalline polymer) and the dichroic dye 164r having the red (R) color, and the reactive mesogens 162 are aligned in the rubbing direction of the alignment layer 154 and the dichroic dyes 164r having the red (R) color are aligned along the reactive mesogens 162.

Here, the first polarization layer 156 includes 1 to 3 wt % of dichroic dye 164g having a green (G) color and 1 to 3 wt % of dichroic dye 164b having a blue (B) color, and the second polarization layer 157 includes 1 to 7 wt % of dichroic dye 164r having a red (R) color.

As illustrated in FIG. 5C, the polarizer having the structure includes the reactive mesogens 162 (or liquid crystalline polymer), the dichroic dye 164r having a red (R) color, and a dichroic dye 164b having a blue (B) color, and the reactive mesogens 162 are aligned in the rubbing direction of the alignment layer 164 and the dichroic dye 164r having the red (R) color and the dichroic dye 164b having the blue (B) color are aligned along the reactive mesogens 162.

Also, the second polarization layer 157 includes the reactive mesogens 162 (or polycrystalline polymer) and the dichroic dye 164g having the green (G) color, and the reactive mesogens 162 are aligned in the rubbing direction of the alignment layer 154 and the dichroic dyes 164g having the green (G) color are aligned along the reactive mesogens 162.

Here, the first polarization layer 156 includes 1 to 3 wt % of dichroic dye 164r having a red (R) color and 1 to 3 wt % of dichroic dye 164b having a blue (B) color, and the second polarization layer 157 includes 1 to 7 wt % of dichroic dye 164g having a green (G) color.

In this manner, in the polarizer having the structures illustrated in FIGS. 5A through 5C, two polarization layers are provided, and one layer includes the dichroic dyes having two types of colors and the other layer includes one type of dichroic dye. Thus, compared with a case in which three types of dichroic dyes are included in a single layer, a large amount of dyes may be included, and thus, light having wavelengths corresponding to the colors of the dyes may be completely absorbed. Also, compared with the structure illustrated in FIG. 2, the number of polarization layers is reduced, simplifying the process and reducing the thickness of the polarizer.

Meanwhile, in FIGS. 5A through 5C, the polarization layer including the dichroic dyes having the two types of colors are formed in the lower portion and the polarization layer including the dichroic dye having one type of color is formed in the upper portion, but the polarization layer including the dichroic dye having one type of color may be formed in the lower portion and the polarization layer including the dichroic dyes having the two types of colors may be formed in the upper portion.

Figure 6:
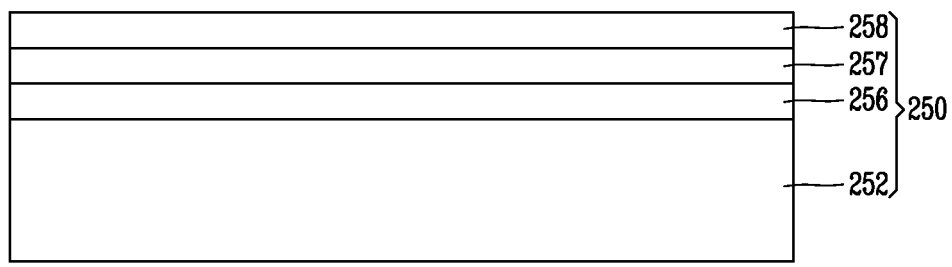
FIG. 6 is a cross-sectional view illustrating a structure of a polarizer according to another embodiment of the present disclosure.

FIG. 6 is a cross-sectional view illustrating a structure of a polarizer according to another embodiment of the present disclosure.

As illustrated in FIG. 6, a polarizer 250 having this structure includes a substrate 252 and first to third polarization layers 256, 257, and 258 formed on the substrate 252. Compared with the polarizer having the structure illustrated in FIG. 2 in which the alignment layer is formed between the substrate and the polarization layer and the hosts of the polarization are aligned in a predetermined direction, in this embodiment, an alignment layer is not formed and the polarization layers 256, 257, and 258 are directly formed on the substrate 252.

In this embodiment, since a linearly polarized material is irradiated as a host material, a photo-alignment or photo-sensitive polymer such as a liquid crystalline polymer or liquid crystal small molecules having a photosensitive group representing an optical anisotropy and liquid crystal properties in a particular temperature section may be used.

Such a host material includes a polyacrylate-based main chain and one or a plurality of side chains connected to the main chain, and one or two aromatic materials are provided in each of the side chains, and a photo-sensitive material is provided as an end group of the side chains, generating a photo-isomerization reaction or a photo-dimerization reaction. Also, a hydrogen coupler may be provided as an end group.

When the linearly polarized light is irradiated to the host material, a photo-isomerization reaction and a photo-dimerization reaction take place in the photo-sensitive polymer, generating anisotropy in the photo-sensitive polymer to align the photo-sensitive polymer in a predetermined direction. This will be described in more detail.

When light is irradiated to the photo-sensitive polymer as a host material, the end group attached to the side chains of the photo-sensitive polymer causes a photo-isomerization reaction and a photo-dimerization reaction to take place. That is, when linearly polarized light is irradiated to the photo-sensitive polymer having optical anisotropy, molecules of the side chains of the photopolymer parallel to the polarization direction of light, that is, parallel to the field direction of light absorb energy of light, generating the photo-isomerization reaction.

Accordingly, the side chains parallel to the polarization direction of light, that is, parallel to the direction of the electric field form a Z-isomer, and side chains perpendicular to the direction of the electric field remain as E-isomer, having weak anisotrophy in the direction of the remaining E-isomer, and thus, the direction of the side chains of the overall host material is determined to be perpendicular to the polarization direction of light.

In the case where the polarizer is manufactured using the photo-sensitive polymer as host materials, guest materials such as dichroic dyes having R, G, and B colors are mixed in the host materials, and the R, G, and B dyes are aligned in the direction of the side chains of the photo-sensitive polymer. That is, the R, G, and B dyes are aligned to be perpendicular to the linear polarization direction of irradiated light.

In this manner, since the R, G, and B dyes are aligned in the predetermined direction, when light is input, a polarization component parallel to the alignment direction of the R, G, and B dyes, that is, the absorption direction is absorbed, and a polarization component perpendicular to the absorption direction is transmitted to polarize the incident light.

In the polarizer having the foregoing structure, since the polarization layers are formed as a plurality of layers including dichroic dyes having different colors to absorb light having a corresponding wavelength band in each layer, and thus, incident light may be completely polarized.

A method of manufacturing the polarizer having this structure is substantially similar to the manufacturing method illustrated in FIGS. 4A through 4D. In the polarizer having the structure illustrated in FIG. 2, the alignment layer is provided, requiring a process of rubbing the alignment layer, but in this embodiment, since the hosts are aligned by irradiating light without the necessity of an alignment layer, a first polarization material is directly applied to the substrate 252, linearly polarized light is irradiated thereto to cure the first polarization material and align the hosts and the guests of the first polarization material in a direction (the linear polarization direction, etc.), thereby forming the first polarization layer 256 having an absorption axis and a transmission axis in a particular direction, without the necessity of an alignment layer formation and rubbing process. In addition, the polarization material and light irradiation process may be repeatedly performed to form the second polarization layer 257 and the third polarization layer 258.

Thus, in this embodiment, since an alignment layer is not required, manufacturing cost may be reduced, the structure of the polarizer may be simplified and a thickness thereof may be minimized. Also, since the process of rubbing an alignment layer is not required in the polarizer having the structure, a manufacturing process may be simplified.

According to embodiments of the present invention, since liquid crystalline polymer (or liquid crystalline high molecules) or liquid crystalline monomer (or liquid crystalline low molecules) and dichroic dyes are mixed and coated on a substrate to manufacture a polarizer, manufacturing cost may be reduced and heat resistance and moisture resistance may be enhanced.

In addition, since a plurality of polarization layers are formed and dichroic dyes having different colors are included in the polarization layers, a larger amount of dyes may be included, compared with a case in which various types of dyes are included in a single polarization layer. As a result, even when the polarization layers thinner than a single polarization layer are formed, light having a wavelength corresponding to a color of a corresponding dye may be completely absorbed, increasing a polarization degree and transmittance.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A polarizer comprising:
 a substrate; and
 a plurality of polarization layers on the substrate,
 wherein each of the polarization layers includes hosts and dichroic dyes having different colors.

2. The polarizer of claim 1, further comprising:
 an alignment layer between the substrate and the plurality of polarization layers.

3. The polarizer of claim 2, wherein the hosts are formed of a material selected from reactive mesogens, liquid crystalline polymer, and oligomer.

4. The polarizer of claim 1, wherein the hosts includes a photosensitive group and a photo-sensitive polymer.

5. The polarizer of claim 1, wherein the dichroic dyes includes red, green, and blue dyes.

6. The polarizer of claim 1, wherein the dichroic dyes includes cyan, yellow, and magenta dyes.

7. The polarizer of claim 1, wherein the substrate includes transparent glass, plastic, or film.

8. The polarizer of claim 1, wherein the plurality of polarization layers include:
 a first polarization layer including a dichroic dye having a red (R) color;

a second polarization layer including a dichroic dye having a green (G) color; and a third polarization layer including a dichroic dye having a blue (B) color.

9. The polarizer of claim 1, wherein the plurality of polarization layers include:

a first polarization layer including two types of dichroic dyes among dichroic dyes having R, G, and B colors; and a second polarization layer including a dichroic dye having other color of R, G, and B colors.

10. The polarizer of claim 1, wherein the plurality of polarization layers include:

a first polarization layer including a dichroic dye having a cyan color;

a second polarization layer including a dichroic dye having a magenta color; and a third polarization layer including a dichroic dye having a yellow color.

11. The polarizer of claim 1, wherein the plurality of polarization layers include:

a first polarization layer including two types of dichroic dyes among dichroic dyes having cyan, magenta, and yellow colors; and a second polarization layer including a dichroic dye having other color of cyan, magenta, and yellow colors.

12. The polarizer of claim 8 or 10, wherein the content of dichroic dyes included in each of the polarization layers ranges from 1 to 7 wt %.

13. The polarizer of claim 12, wherein the content of dichroic dyes included in each of the polarization layers ranges from 3 to 7 wt %.

14. The polarizer of claim 9 or 11, wherein the content of the dichroic dyes included in the first polarization layer ranges from 1 to 3 wt %, and the content of the dichroic dyes included in the second polarization layer ranges from 1 to 7 wt %.

15. The polarizer of claim 1, wherein the number of polarization layers is determined according to wavelength bands of light absorbed by each polarization layer.

16. The polarizer of claim 1, wherein a thickness of the plurality of polarization layers is 10 µm or less.

17. The polarizer of claim 16, wherein a thickness of the plurality of polarization layers is 5 µm or less.

18. A liquid crystal display (LCD) device comprising:
a liquid crystal panel for displaying an image; and
a polarizer attached to at least one of both surfaces of the liquid crystal panel,
wherein the polarizer includes a substrate and a plurality of polarization layers on the substrate, the polarization layer having dichroic dyes having different colors.

19. The LCD device of claim 18, further comprising:
an alignment layer between the substrate and the plurality of polarization layers.

20. The LCD device of claim 18, wherein the plurality of polarization layers include:

a first polarization layer including a dichroic dye having a red (R) color;

a second polarization layer including a dichroic dye having a green (G) color; and a third polarization layer including a dichroic dye having a blue (B) color.

21. The LCD device of claim 18, wherein the plurality of polarization layers include:

a first polarization layer including two types of dichroic dyes among dichroic dyes having R, G, and B colors; and a second polarization layer including a dichroic dye having other color of R, G, and B colors.

22. The LCD device of claim 18, wherein the plurality of polarization layers include:

a first polarization layer including a dichroic dye having a cyan color;

a second polarization layer including a dichroic dye having a magenta color; and a third polarization layer including a dichroic dye having a yellow color.

23. The LCD device of claim 18, wherein the plurality of polarization layers include:

a first polarization layer including two types of dichroic dyes among dichroic dyes having cyan, magenta, and yellow colors; and a second polarization layer including dichroic dyes having other color of cyan, magenta, and yellow colors.

24. The LCD device of claim 20 or 22, wherein the content of dichroic dyes included in each of the polarization layers ranges from 1 to 7 wt %.

25. The LCD device of claim 24, wherein the content of dichroic dyes included in each of the polarization layers ranges from 3 to 7 wt %.

26. The LCD device of claim 21 or 23, wherein the content of the dichroic dyes included in the first polarization layer ranges from 1 to 3 wt %, and the content of the dichroic dyes included in the second polarization layer ranges from 1 to 7 wt %.

27. The LCD device of claim 18, wherein the liquid crystal panel includes an in-plane switching (IPS) mode LCD device, a vertical alignment (VA) mode LCD device, a fringe field switching (FFS) mode LCD device, and a twisted nematic (TN) mode LCD device.

* * * * *